June 26, 1951 F. W. SCHARF 2,558,199
TOASTER TIMER MECHANISM
Filed Jan. 3, 1947 2 Sheets-Sheet 1
Fig.1.
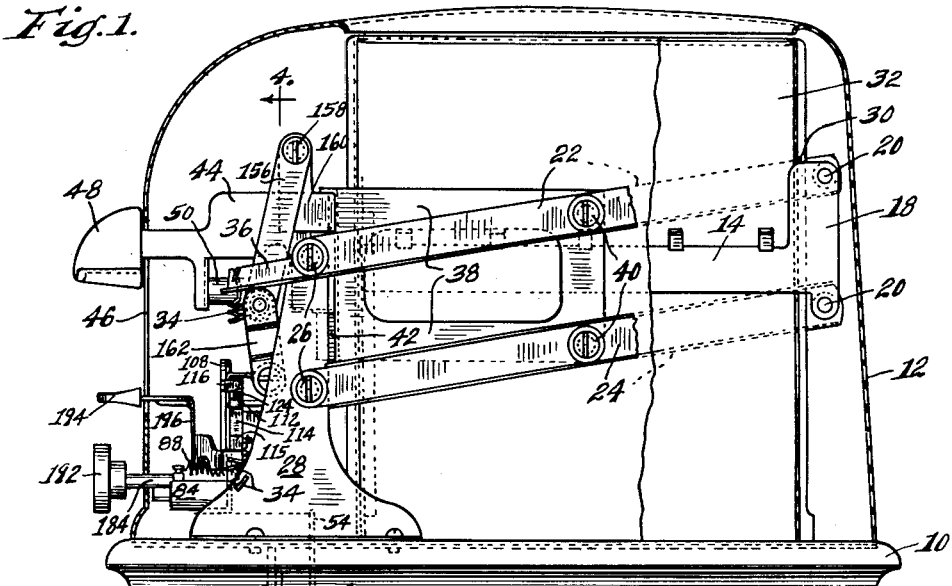
Fig.2.
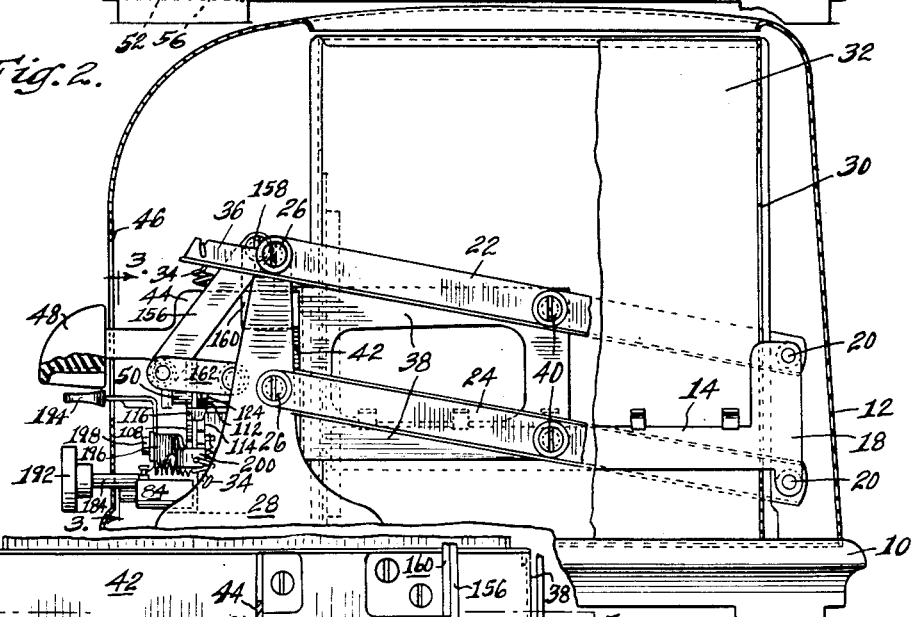
Fig.3.
INVENTOR.
Frank W. Scharf.
BY Bair & Freeman
Att'ys.

June 26, 1951 F. W. SCHARF 2,558,199
TOASTER TIMER MECHANISM
Filed Jan. 3, 1947 2 Sheets-Sheet 2
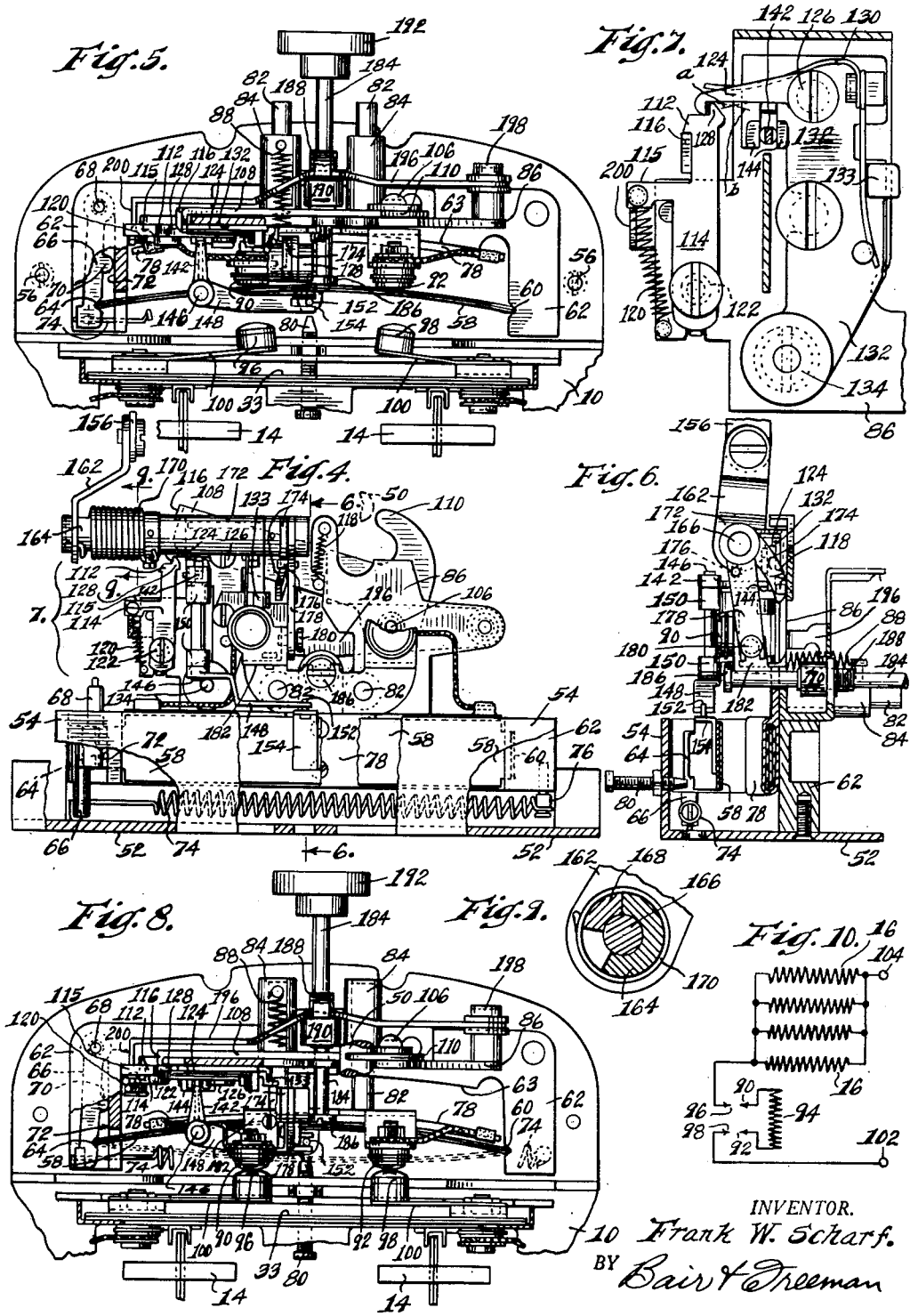
INVENTOR.
Frank W. Scharf.
BY Bair & Freeman
Att'ys.

Patented June 26, 1951

2,558,199

UNITED STATES PATENT OFFICE 2,558,199

TOASTER TIMER MECHANISM

Frank W. Scharf, Arcadia, Calif., assignor, by mesne assignments, to Knapp-Monarch Company, St. Louis, Mo., a corporation of Delaware Application January 3, 1947, Serial No. 720,063

7 Claims. (Cl. 99—329)

My present invention relates to toaster timing mechanism and particularly one capable of producing successive slices of toast which are substantially uniform in color.

One object of the invention is to provide a toaster timer having a heating element and a bimetal element heated thereby, together with means to provide for quick recycling of the timer so that there is no waiting between toasting operations.

Another object is to provide the timing means with a heater for a thermal element which heater is movably mounted to engage the thermal element until such time as the thermal element snaps to "off" position and releases a bread carrier as well as the heater from the position to which it was moved at the beginning of the timing cycle, the heater thereupon moving away from the thermal element and into engagement with a heat-absorbing shoe to quickly cool the heater, thus permitting rapid recycling.

Still another object is to provide means for causing snap action of a bimetal timing element to position for releasing a bread carrier and for opening the circuit of the heating element of the toaster, the bimetal element, however, snapping out of such position after some cooling thereof.

A further object is to provide timing mechanism in which during the "off" cycle the heater remains in contact with the heat-absorbing shoe and is not moved into contact with the bimetal element again until another bread toasting operation is initiated.

Still a further object is to provide timing mechanism including a means that permits the bread carrier to be depressed but prevents the timing heater from being energized in the event that the bread carrier is depressed before the bimetal element returns from its tripped position due to heat from the heater, subsequent return of the bimetal element permitting energization of the heater and heating elements of the toaster, and movement of the heater to a position of engagement with the bimetal element. In this way, if the toaster is recycled faster than the bimetal element can return from tripped position, the toaster can, nevertheless, be manually adjusted for initiation of a toasting cycle and will automatically commence such cycle when the bimetal element and the heater are cooled the proper amount to make the next cycle produce the same color of toast.

An additional object is to provide a switch for the heating element circuit which serves also for the circuit of the heater and has movable contacts that are carried by the heater, so that when it moves to timing position it engages those contacts with stationary contacts in the circuit.

Another additional object is to provide means for adjusting the timing which is operable by predetermining the proximity of the heater in relation to the bimetal element.

With these and other objects in view, my invention consists in the construction, arrangement ant combination of the various parts of my toaster timer mechanism, whereby the objects contemplated are attained, as hereinafter more fully set forth, pointed out in my claims, and illustrated in the accompanying drawings, in which:

Figure 1 is a side elevation of a toaster embodying my present invention showing the housing therefor in section and the bread carrier in raised position.

Figure 2 is a similar view showing the bread carrier in lowered position.

Figure 3 is an enlarged sectional view on the line 3—3 of Figure 2, showing the position of the parts of the timer when the bread carrier is latched in lowered or toasting position.

Figure 4 is an enlarged sectional view on the line 4—4 of Figure 1 showing the timer parts in the position of bread carrier release.

Figure 5 is a sectional view on the line 5—5 of Figure 3 showing the timer parts in released position.

Figure 6 is a sectional view on the line 6—6 of Figure 4.

Figure 7 is an enlarged elevation of a portion of Figure 4 indicated by the bracket 7, with portions of Figure 4 omitted to show further details.

Figure 8 is a sectional view similar to Figure 5 showing the timing mechanism in timing position.

Figure 9 is an enlarged sectional view on the line 9—9 of Figure 4, and

Figure 10 is an electro-diagrammatic view showing the electric circuit connections of the timer and the heating elements of the toaster.

On the accompanying drawings, I have used the reference numeral 10 to indicate a toaster base and 12 a housing for the toaster mechanism. Within the housing 12 a pair of toasting compartments are provided in the usual manner and each has a heating element on each of its sides which heating elements are shown at 16 in Figure 10. These, of course, are for the purpose of toasting bread inserted in the toasting chambers and carried by bread carriers 14. While I have described a two-chamber toaster, it is obvious that one, or three or more toasting compartments can be provided instead of two.

Each bread carrier 14 has at the rear of the toaster a vertical link 18 and these links are mounted on rods 20. The rods 20 extend to the sides of the toasting compartments, where an upper arm 22 is pivoted to each end of the upper rod 20 and a lower arm 24 is pivoted to each end of the lower rod 20. The arms 22 and 24 are pivoted on stationary pivots 26 carried by brackets 28 mounted on the base 10.

Thus a parallelogram arrangement is provided by the pivots 20 and 26 and the arms 22 and 24 for the purpose of keeping the links 18 vertical in all positions of adjustment and consequently the bread carriers 14 horizontal. The links 18 slide in vertical slots 30 of an inner housing 32 that contains the heating elements and toasting compartments and is completely concealed by the casing 12, as shown in Figures 1 and 2.

The bread carriers 14 are biased to the upper position shown in Figure 1 by means of springs 34 connected to extensions 36 of the arms 22. In Figures 1 and 2 only the upper and lower ends of the springs are shown, the intermediate portions thereof being broken away to permit of illustration of timer details.

For depressing the bread carriers 14, I provide a rectangular frame 38 for each side of the toaster and each pivoted to its respective arm 22 and 24 by pivots 40. These frames are connected together at the front of the housing 32 by a cross plate 42 (see Fig. 3), to the center of which an extension 44 is attached. The element 44 extends through a slot 46 in the front wall of the casing 12 and terminates in a bread carrier depressing knob 48. The extension 44 carries a pin 50 adapted to coact with a latch of the timer mechanism, as will hereinafter be described.

The bread carrier operating mechanism just described permits relatively great movement of the bread carriers 14 with a short stroke of the knob 48, due to the arms 42 and 24 being swung by means of the frame 38 and pivoted intermediate the ends of the arms. At the same time, the frame 38 and the knob 48 are retained in level position, due to the parallelogram arrangement of the pivots 26 and 40 and the arms 22 and 24.

My timing mechanism consists of a base plate 52 having an upstanding flange 54 on which the various operating parts of the timing mechanism are mounted as a unit, so that the base plate can be secured against the bottom of the toaster base 10 as by means of screws 56 shown in Figure 1. When the screws are removed, the timer unit can be withdrawn from the toaster as a unit for repair, and during fabrication of the toaster these units can be tested before being secured in the toaster casing. Figures 4, 5, 6 and 8 show the unit removed from the toaster.

The timing mechanism further includes a bimetal element 58 which is normally bowed to the shape shown in Figure 5 by reason of having one of its ends in a V-seat 60 of a heat-absorbing shoe member 62 and its other end seated in a V-seat 64 of an arm 66. The arm 66 is pivoted at 68 to the shoe member 62 and is biased to the position of Figure 5 with a stop lug 70 against a flange 72 of the member 62 by a spring 74. One end of the spring is connected to the arm 66 and the other is connected to a pin 76 extending from the member 62, as shown in Figure 4.

The bimetal element shown "cold" in the position of Figure 5 may be heated by a metal encased electrical heater 78, whereupon it will tend to bow in the opposite direction and engage an adjustable stop 80, as shown by dotted lines in Figure 8. This bowed position, it will be noted, is very slight so that upon slight cooling of the bimetal, it will snap back to the position shown by solid lines.

The heater 78 is carried by a pair of pins 82 slidable in bosses 84 of a vertical frame plate 86 secured to the top of the heat-absorbing shoe member 62. The heater is normally constrained to the retracted position of Figure 5 by a spring 88. The heater 78 carries a pair of contacts 90 and 92 which are insulated from the metallic casing of the heater, but electrically connected with a resistance wire within the casing and shown diagrammatically at 94 in Figure 10. The contacts 90 and 92 are adapted to engage with stationary contacts 96 and 98 carried by leaf springs 100 mounted on the front wall 33 of the inner housing 32, as shown in Figures 5 and 8. These contacts 96 and 98 are in circuit with supply terminals 102 and 104, as shown in Figure 10, and in the circuit are the heating elements 16 so that they and the resistance coil 94 of the heater 78 are in a series circuit when the heater 78 is moved to the position of Figure 8 for heating the bimetal element 58 during the timing cycle.

Pivoted at 106 on the vertical frame plate 86 is a latch lever 108 having a hook-like projection 110 adapted at times to coact with the pin 50 of the bread carrier 14, as shown in Figure 3. This latches the bread carriers in lowered position with a lug 112 of a catch 114 above a lug 116 of the latch lever 108, as shown in Figure 7. When the catch 114 is rotated clockwise from the position shown, it will release the lug 116, thereby permitting the springs 34 of the bread carriers to raise them and will permit a spring 118 (see Fig. 4) to raise the latch lever 108 to the position in that figure for a subsequent toasting and timing cycle. The catch 114 is normally biased in a counterclockwise direction in Figure 7 by a spring 120, the catch itself being pivoted at 122.

For releasing the catch 114, I provide a hook-like dog 124 pivoted at 126 and normally engaged with a lug 128 of the catch by a spring 130. The pivot 126 is carried by a lever 132 pivoted at 134. The lever 132 is adapted to be moved clockwise about the pivot 134 by means of an arm 142 between a pair of lugs 144 on the lever. The arm 142 is secured to a vertical shaft 146 (see Fig. 8) having at its lower end a second arm 148. The shaft 146 is journalled in bearings 150 extending from the frame plate 86.

The arm 148 has a forked end engaging a pin 152 carried by a lug 154 on the bimetal element 58.

The heater 78 is moved from the position of Figure 5 to the position of Figure 8 by a link 156 (see Fig. 1) pivoted at 158 to an arm 160 extending from the bread carrier front plate 42. The link 156 is pivotally connected with a lever 162 mounted on a sleeve 164, which in turn is oscillatable on a shaft 166 and normally assumes the counterclockwise biased position shown in Figure 9 against a projection 168 secured to the shaft 166. Obviously, this arrangement permits some lost motion in a clockwise direction, the purpose of which will hereinafter be described.

The sleeve 164 and the shaft projection 168 are retained normally in the position of Figure 9 by a spring 170 which imparts the counterclockwise bias to the sleeve. The shaft 166 is journalled in a bearing sleeve 172 secured to the frame plate 86 and has an arm 174 adapted to engage a pin 176 of another arm 178. The arm 178 is mounted for free rotation on the shaft 166 and extends downwardly to a stud 180 secured to a bracket 182. The bracket 182, in turn, is part of the heater 78 so that the arm 178 is utilized to move the heater from the position of Figure 5 to the position of Figure 8 when the shaft 166 is rotated clockwise in Figure 9.

In Figure 8 it will be noted that the heater 78 is spaced slightly from the bimetal element 58. This spacing may be varied for changing the timer setting. At one setting close to the heater the bimetal is heated more quickly and, therefore, the less time it takes to heat the bimetal to the required temperature and cause it to snap from the full line to the dotted line position of Figure 8. At other settings farther from the heater the timing will be increased in some proportion to the distance.

The setting adjustment consists of a shaft 184 having a head 186 against which the heater 78 engages under the tension of the spring 170 when the bread carrier is down in the position of Figure 2. The shaft 184 has an enlarged threaded portion 188 in a tapped boss 190 of the frame plate 86. The shaft terminates in a control knob 192 on the outside of the casing 12 so that the timing position of the heater 78 in relation to the bimetal element 58 may be adjusted as desired and thus "color control" of the toast may be had.

In some cases, it is desirable to manually release the bread carrier so that it will rise and the toast can be inspected before the end of the timing period. This can be accomplished in my tensioning mechanism with a release knob 194 mounted on a lever 196. The lever 196 is pivoted at 198 to the frame plate 86 and opposite the pivoted end has a lug 200 adapted to engage under an extension 115 of the catch 114 as in Figure 7, for lifting this extension and thereby imparting clockwise rotation to the catch 114 for removing the lug 112 from overhanging position with relation to the lug 116 of the latch lever 108. The bread carrier will then be raised by the springs 34 and the link 156 will swing the arm 162 from the position of Figure 2 to the position of Figure 1, thereby swinging the lever 174 in a direction away from the pin 176 (Figure 4) thereby permitting the spring 88 to retract the heater 78 to its initial position. As soon as the toast is inspected, if the knob 48 is again depressed, the timing mechanism will be placed in operation and will continue substantially where it left off, completing the timing period without disturbing it to an extent which would change the final color of the toast when the timer trips out.

The heat absorbing shoe member 62 has a curved face 63, against which the heater 78 (also curved to fit the bimetal 58) is engaged under the action of the spring 88 after the timing cycle. The face 63, by closely fitting the casing of the heater 78, provides for good thermal conduction so that heat can be quickly absorbed by it from the heater between timing cycles. The shoe 62 then radiates this heat to the surrounding atmosphere during the timing cycle and this arrangement effects a quick cool-down of the heater so that relatively quick recycling of the timer is possible and yet uniform toast is had. Otherwise a substantial amount of residual heat in the heater would result in the second timed cycle being unduly shortened.

*Practical operation*

In the operation of a toaster equipped with my timer mechanism, after the bread is inserted the knob 48 is depressed for lowering the bread carriers 14 which results in the shaft 166 being rotated clockwise in Figure 9 under the force of the spring 170. The lever 174 engages the pin 176 and moves the lever 178 to the farthest position that the heater 78 can assume as determined by the head 186 of the shaft 184. Thereafter, further downward movement of the bread carrier and consequently of the lever 162 will merely wind up the spring 170 and cause the sleeve 168 of Figure 9 to move clockwise away from the shaft lug 168. The heater 78 is thus held in engagement with the head 186 under the force of this spring, yet leeway is provided for variation in the setting of the head 186 and in manufacturing tolerances.

As the knob 48 is lowered, it lowers the pin 50, which pin, as shown by dotted lines in Figure 4, can pass by the hook-like extension of the latch lever 108. As soon as it engages the latch lever below the hook, it swings the latch lever down to the position of Figures 3 and 7 (the lug 116 under the lug 112), and when the knob 48 is released, the pin 50 rises until it engages under the hook 110, as shown in Figure 3. Thus the bread carriers are latched in the lowered position.

At the end of the timing period determined by heat from the heater 78 warping the bimetal element 58 to such an extent that it snaps from the full line position of Figure 8 to the dotted line position, the bimetal element rocks the shaft 146 clockwise in Figure 5, thus swinging the outer end of the arm 142 shown in section in Figure 7 to the right and causes rotation of the lever 132 about the pivot 134. The first part of this movement results in the hook 124 acting on the lug 128 of the catch 114 to swing it clockwise, thereby releasing the lug 112 of the lever 114 from the lug 116. The latch lever 108 accordingly can be then swung upwardly by the action of the springs 34 and 118.

During the last portion of the movement of the lever 132 to the right, the hook 124 swings off the lug 128 because of swinging about the pivot 134, and this causes elevation of the hook 124, as indicated by the circumferential line *a* about 134 as a center in Figure 7. At the same time the upper end of the lug 128 swings downwardly as indicated by the circumferential line *b* about 122 as a center, so that these parts are finally disengaged from each other and the catch 114 swings back to the initial position ready for another latching operation if the bread carrier is depressed prior to the time the bimetal element 58 returns from the dotted position of Figure 8 to the solid line position.

In the event that the bread carrier is moved downwardly before such return, the lever 132 will still be to the right in Figure 7 so that a lug 133 thereon is in the way of the lever 174. Accordingly when the bread carrier is depressed, the lever 174 will engage the lug 133 and be stopped thereby, whereupon the bread carrier can be depressed, but the lever 178 will not be moved and there will be a winding up of the spring 170. Thus the contacts 90 and 92 are not closed against the contacts 92 and 98 prior to proper cooling of the bimetal element 58 but the bread carriers can be latched in lowered position the same as in normal timing cycles.

Subsequently, when the bimetal element snaps back to the full line position of Figure 8, the elements 148, 146 and 142 will move in a reverse direction for swinging the lever 132 counterclockwise in Figure 7 to the position there shown, thus causing the hook 124 to slide over the lug 128 and finally come to rest in a position for subsequently operating the catch 114 to latch-releasing position.

With such an arrangement the operator need never wait for proper cool-down of the timing mechanism and if he happens to recycle the timer too soon for proper timing, the timing mechanism itself does the waiting and within a few seconds the bimetal element returns to normal position and initiates the next timing cycle by removing the lug 133 from in front of the lever 176, so that the wound spring 170 then actuates the lever 178 and accordingly the heater 78 to timing position. At the same time this closes the contacts 90 and 92 against the contacts 96 and 98 for establishing the toasting and timing circuits.

Manual release is possible at any time by lifting on the knob 194 which is a natural operation if this knob is located directly under the bread carrier knob 128 when it is in the position of Figure 2. It is natural for an operator to try to lift the knob 48 for raising the bread carriers, whereas, when he attempts to do so he merely engages the knob 194 and releases the timing mechanism manually so that the bread carrier is raised in the usual manner, that is, by the springs 34 following unlatching.

Some changes may be made in the construction and arrangement of the parts of my toaster timer mechanism without departing from the real spirit and purpose of my invention, and it is my intention to cover by my claims such modified forms of structure or use of mechanical equivalents as may be reasonably included within their scope.

I claim as my invention:

1. In a toaster and timer of the character disclosed, a bread carrier, an electric heater element, a bimetal element adapted to be heated thereby for terminating a timing period, said electric heater element being movably mounted relative to said bimetal element to assume one position for heating said bimetal element, manual means to move said heater element to said one position and said bread carrier to toasting position, biasing means opposing said manual means, a latch lever for said bread carrier, a catch for said latch lever in the toasting position of the bread carrier, means operable from said bimetal element when heated to a predetermined degree for releasing said catch and thereby permitting said biasing means to move said electric heater element to another position remote from said bimetal element, and a heat-absorbing shoe engaged by said heater when it assumes said another position.

2. In a timer of the character disclosed, an electric heater element, biasing means therefor, a bimetal element adapted to be heated thereby for terminating a timing period, said elements being relatively movable manually to a position of relative proximity and by said biasing means to another position spaced apart, a latch lever, a catch for said latch lever in timing position to hold the latch lever against the action of said biasing means, means operable from said bimetal element when heated to a predetermined degree for releasing said catch, and a heat-absorbing shoe engaged by said heater after release of said catch from said latch lever and when said another position is assumed by the action of said biasing means.

3. In a toaster and timer, a bread carrier biased to non-toasting position, an electrically heated element, a bowed bimetal element adapted to be heated by said electrically heated element, a latch lever for said bread carrier, a catch for said latch lever in the toasting position of the bread carrier, said bimetal element when heated to a predetermined degree bowing in an opposite direction, an operative connection between said bimetal element and said catch for releasing the catch when said bimetal element bows in said opposite direction, and a heat-absorbing shoe spaced therefrom, said electrically heated element being movable in the space between said bimetal element and heat absorbing shoe to engage said bimetal element when said electrically heated element is energized thereby to be heated and to be engaged with said heat absorbing shoe by said bias upon release of said catch.

4. In a toaster for bread or the like, heating means for slices of bread to be toasted in succession, thermostatic means for opening the circuit of said heating means upon application of a predetermined amount of heat to each of said slices of bread to terminate the cooking intervals, a movable heater for said thermostatic means biasing means to move the same to a cooling position, means for rapidly cooling the heater, comprising a heat-absorbing shoe, said heater being movable by said biasing means into engagement therewith and manually into position adjacent said thermostatic means for heating it by direct radiation, said thermostatic means being of the snap acting type and capable of remaining only in initial position except for a short period of time following snap action to heated position, whereupon the toaster timer cycle is terminated.

5. In a toaster and timer mechanism, heating elements for bread, a bread carrier to manually lower bread between said heating elements, spring means to raise the same, a latch to retain said bread carrier in the lowered position, a bowed thermally responsive member having its ends biased toward each other, a heater therefor curved to substantially the curvature of said thermally responsive member, means biasing said heater to one position, contacts carried by said heater to close the circuit through it and through said heating elements when said heater is moved away from said position, said heater being operatively connected with said bread carrier to be moved away from said position when said carrier is lowered, said heater when in said position being adjacent said thermally responsive member throughout substantially the entire extent of said thermally responsive member to radiate heat thereto and reverse the curvature thereof at the termination of a timing period, said thermally responsive member being operatively connected with said latch to release the same when its curvature is so reversed, a heat absorbing shoe having a face curved to fit said heater, said heater being moved by its bias to engage said face of said shoe when said latch is released and said thermally responsive member upon cooling returning to its initial bowed position.

6. In a timer mechanism, a timer including an electric heater and a thermally responsive member, means to manually position the two adjacent each other for the direct radiation of heat from said heater to said thermally responsive member upon initiation of a timing period, a latch for said positioning means in the position just described, a heat absorbing shoe, said electric heater being movable to engage said shoe at the termination of the timing period, spring means to cause such engagement, said spring means being latched by said latch when the timing period is initiated and an operative connection between said thermally responsive member and said latch to release the latch so that said spring means can move the heater from a position adjacent the thermally responsive element to a position contacting with the shoe.

7. In a toaster and timer mechanism, said toaster having a bread carrier and a latch therefor in the toasting position thereof, a timer including a curved electric heater and a bowed thermally responsive member which reverses its direction of bowing upon heating or cooling thereof, manual means to position the two upon initiation of a timing period so that heat from said heater causes said thermally responsive member to reverse its direction of bowing, a heat absorbing shoe, said heater being engageable therewith at the termination of the timing period, said shoe being curved for contact of said heater therewith throughout substantially the entire length of said heater, spring means tending to move said heater in opposition to said manual means, and an operative connection between said thermally responsive member and said latch for said bread carrier to release the latch and thereby permit said spring means to move the heater from the thermally responsive element to the shoe.

FRANK W. SCHARF.

REFERENCES CITED

The following references are of record in the file of this patent:

UNITED STATES PATENTS

| Number | Name | Date |
| --- | --- | --- |
| 2,196,394 | Ireland | Apr. 9, 1940 |
| 2,288,748 | Scharf | July 7, 1942 |
| 2,389,927 | Parr | Nov. 27, 1945 |
| 2,426,620 | Koci | Sept. 2, 1947 |
| 2,436,735 | Walder et al. | Feb. 24, 1948 |
| 2,439,017 | Meyers | Apr. 6, 1948 |